United States Patent
Burd

(10) Patent No.: US 9,919,575 B2
(45) Date of Patent: Mar. 20, 2018

(54) DEVICE FOR REVERSING CHILLER AIRFLOW IN AN AIRCRAFT GALLEY

(71) Applicant: B/E AEROSPACE, INC., Wellington, FL (US)

(72) Inventor: Peter John Leslie Burd, Carmarthenshire (GB)

(73) Assignee: B/E Aerospace, Inc., Wellington, FL (US)

(*) Notice: Subject to any disclaimer, the term of this patent is extended or adjusted under 35 U.S.C. 154(b) by 671 days.

(21) Appl. No.: 14/464,988

(22) Filed: Aug. 21, 2014

(65) Prior Publication Data

US 2015/0059378 A1 Mar. 5, 2015

Related U.S. Application Data

(60) Provisional application No. 61/872,420, filed on Aug. 30, 2013.

(51) Int. Cl.
| | |
|---|---|
| *F25D 17/04* | (2006.01) |
| *B60H 1/00* | (2006.01) |
| *B64D 11/04* | (2006.01) |
| *B64D 13/06* | (2006.01) |

(52) U.S. Cl.
CPC ..... *B60H 1/00014* (2013.01); *B60H 1/00021* (2013.01); *B64D 11/04* (2013.01); *B64D 13/06* (2013.01); *B60H 2001/00092* (2013.01); *B60H 2001/00185* (2013.01); *B64D 2013/0629* (2013.01)

(58) Field of Classification Search
CPC ............ B60H 1/00014; B60H 1/00021; B60H 2001/00185; B60H 2001/00092; B64D 11/04; B64D 13/06; B64D 2013/0629
See application file for complete search history.

(56) References Cited

U.S. PATENT DOCUMENTS

| 2,338,382 A | 1/1944 | Marlow |
| 2,432,587 A | 12/1947 | Ramsey |
| 4,272,966 A | 6/1981 | Niemann et al. |

(Continued)

FOREIGN PATENT DOCUMENTS

| DE | 199 52 523 A1 | 5/2001 |
| JP | H01240315 A * | 9/1989 |

(Continued)

OTHER PUBLICATIONS

Mizuta, Air Conditioner, May 22, 2002, JP2002147800A, Whole Document.*

(Continued)

*Primary Examiner* — Larry Furdge
(74) *Attorney, Agent, or Firm* — Donna P. Suchy

(57) ABSTRACT

A device for reversing chiller airflow in an aircraft galley includes an air bypass port connected between a supply airflow duct and a return airflow duct, and an air recirculation bypass flap is movable between a closed position allowing normal airflow circulation through the supply airflow duct and an open position blocking the supply airflow duct and diverting chilled supply airflow to the return airflow duct for recirculation. The air recirculation bypass flap is electrically actuated by a solenoid responsive to a bay door position detector.

19 Claims, 1 Drawing Sheet

(56) References Cited

U.S. PATENT DOCUMENTS

| | | | | |
|---|---|---|---|---|
| 4,401,260 A | * | 8/1983 | Grant | F23N 3/085 236/9 A |
| 4,953,608 A | * | 9/1990 | Larsson | E06B 9/70 160/1 |
| 5,224,355 A | * | 7/1993 | So | F25B 49/022 62/229 |
| 5,346,127 A | | 9/1994 | Creighton | |
| 6,298,912 B1 | | 10/2001 | Rayburn et al. | |
| 7,231,778 B2 | | 6/2007 | Rigney et al. | |
| 2003/0042015 A1 | | 3/2003 | Rayburn et al. | |
| 2004/0094667 A1 | * | 5/2004 | D'Alvia | B64C 1/1469 244/118.5 |
| 2007/0137234 A1 | * | 6/2007 | Zywiak | B64D 13/06 62/239 |
| 2008/0000242 A1 | * | 1/2008 | Jung | F25D 17/065 62/159 |
| 2010/0224726 A1 | * | 9/2010 | Lu | F25D 17/06 244/118.5 |
| 2010/0240291 A1 | | 9/2010 | Tanner et al. | |
| 2013/0047657 A1 | | 2/2013 | Oswald et al. | |

FOREIGN PATENT DOCUMENTS

| | | | |
|---|---|---|---|
| JP | 2002147800 A | * | 2/2002 |
| JP | 2003-214747 A | | 7/2003 |

OTHER PUBLICATIONS

Kitada et al., On Vehicle Air Conditioner, Sep. 25, 1989, JPH01240315A, Whole Document.*

International Search Report dated Nov. 21, 2014 in PCT/US2014/053263.

International Preliminary Report on Patentability and Written Opinion dated Mar. 1, 2016 in PCT/US2014/053263.

Combined Chinese Office Action and Search Report dated Sep. 14, 2016 in Patent Application No. 201480048098.6 (with English language translation).

* cited by examiner

DEVICE FOR REVERSING CHILLER AIRFLOW IN AN AIRCRAFT GALLEY

CROSS-REFERENCES TO RELATED APPLICATIONS

This application is based upon and claims priority from U.S. Application No. 61/872,420, filed Aug. 30, 2013, incorporated by reference in its entirety.

BACKGROUND

This invention relates generally to transport aircraft galley systems, and more particularly relates to systems to air chiller supply air recirculation systems used to cool aircraft galley food carts.

Aircraft galley systems for modern transport aircraft incorporate food carts which are cooled to prevent food spoilage prior to use by the cabin attendants for distribution of food to passengers. These food carts are typically interfaced with cold air supply systems in the galley designed deliver cooled air via air ducts to cool the interiors of the food carts. Galley cooling systems are typically mounted in a galley cabinet, so that cool air is discharged from the galley cooling system and circulates over or through galley food carts in a galley cabinet to return to the galley cooling system to again be cooled and discharged. However, such galley chilling systems can be misused for cooling an indoor space of a galley area in hot, humid climates during in-flight operation by opening bay doors of galley chilled compartments, which makes it difficult to maintain chilled food in galley food carts at or below a required set temperature, and typically results in the ingestion of a large volume of warm, moist air in the galley cooling systems, which in turn can cause freezing of an evaporator of a galley air chiller unit, requiring premature and/or unscheduled defrost cycles in such galley air chillers.

An air conditioning dehumidification system is known that is provided with indoor and outdoor air, in which indoor air not cooled by passing through a heat exchanger but is directed by a face and bypass damper through a bypass duct extending around the heat exchanger from an input mixing plenum to an output mixing plenum at the output of the heat exchanger, to control cooling of air flowing through the input mixing plenum. Another air conditioning system is known in which a rate of cooling is controlled by varying the operation of refrigerant compressors and by varying flow of recirculating air between a path through an expansion unit where air is cooled and a path bypassing the expansion unit. First and second dampers are controlled by a thermostat, so that the first damper is closed as the second damper is opened.

It would be desirable to provide an apparatus that can reverse chiller airflow in an aircraft galley chilling system to avoid premature and/or unscheduled defrost cycles in galley air chillers from the unnecessary ingestion of moist air when aircraft galley food cart bay doors are opened, and that helps maintain chilled food in aircraft galley food carts at or below a set temperature to limit food poisoning risks. The present invention meets these and other needs.

SUMMARY OF THE INVENTION

Briefly and in general terms, the present invention provides for an apparatus for reversing chiller airflow in an aircraft galley that limits the freezing of the evaporator of a galley chilling unit or air chiller as a result of the ingestion of a large volume of warm moist air when the galley chilled compartment doors are opened during in-flight operation. This is achieved by diverting the supply duct airflow into the return duct by an electrically operated bypass flap integrated into the galley ducting itself and that operates independently of the chilling unit or air chiller. The bypass effectively creates a recirculation short cut loop, allowing the chilling unit or air chiller to continue to function normally, and preventing unscheduled defrost cycles.

The present invention accordingly provides for an apparatus for reversing chiller airflow in an air chiller supply air recirculation system of an aircraft galley including one or more galley food carts having a galley food cart bay door, and a galley chiller air supply and return ducting assembly having a supply airflow duct and a return airflow duct. The supply airflow duct typically includes a supply airflow duct inlet portion configured to receive a chilled supply airflow from a chiller unit and a supply airflow duct outlet portion configured to deliver the chilled air to the one or more galley food carts, and the return airflow duct typically has an air return inlet portion configured to receive a return airflow from the one or more galley carts and an air return outlet portion configured to deliver the return airflow to the chiller unit. In a presently preferred aspect, an air bypass port is connected in fluid communication between the supply airflow duct and the return airflow duct, and an air recirculation bypass flap is movably mounted adjacent to the air bypass port, such that the air recirculation bypass flap is movable between a closed configuration allowing normal airflow circulation through the supply airflow duct and an open configuration blocking at least a substantial portion of the supply airflow duct and diverting at least a substantial portion of the chilled supply airflow to the return airflow duct for recirculation to the chiller unit. In another presently preferred aspect, the return airflow duct includes a connecting portion adjacent to at least a portion of the supply airflow duct, and the air bypass port is located in the connecting portion.

In another presently preferred aspect, the air recirculation bypass flap is electrically actuated, and a solenoid is preferably operatively connected to the electrically actuated air recirculation bypass flap and configured to move the air recirculation bypass flap between the closed and open configurations. In another presently preferred aspect, the air recirculation bypass flap is biased to be in the closed configuration.

In another presently preferred aspect, a bay door position detector is provided that is configured to detect opening of a galley food cart bay door and to generate an electrical signal indicating opening of the galley food cart bay door, and the solenoid is electrically connected to the bay door position detector to receive the electrical signal indicating opening of the galley food cart bay door, and the solenoid is configured to move the air recirculation bypass flap between the closed and open configurations responsive to the electrical signal indicating opening of the galley food cart bay door. In another presently preferred aspect, the bay door position detector may include a micro switch. In another presently preferred aspect, the bay door position detector may include a photoelectric cell, such as an infrared beam detector, for example.

In another presently preferred aspect, a manual override control optionally can be provided for manual control of the air recirculation bypass flap. In another presently preferred aspect, a visual status indicator optionally can be provided that is configured to indicate whether the air recirculation bypass flap is in the closed configuration or the open configuration.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
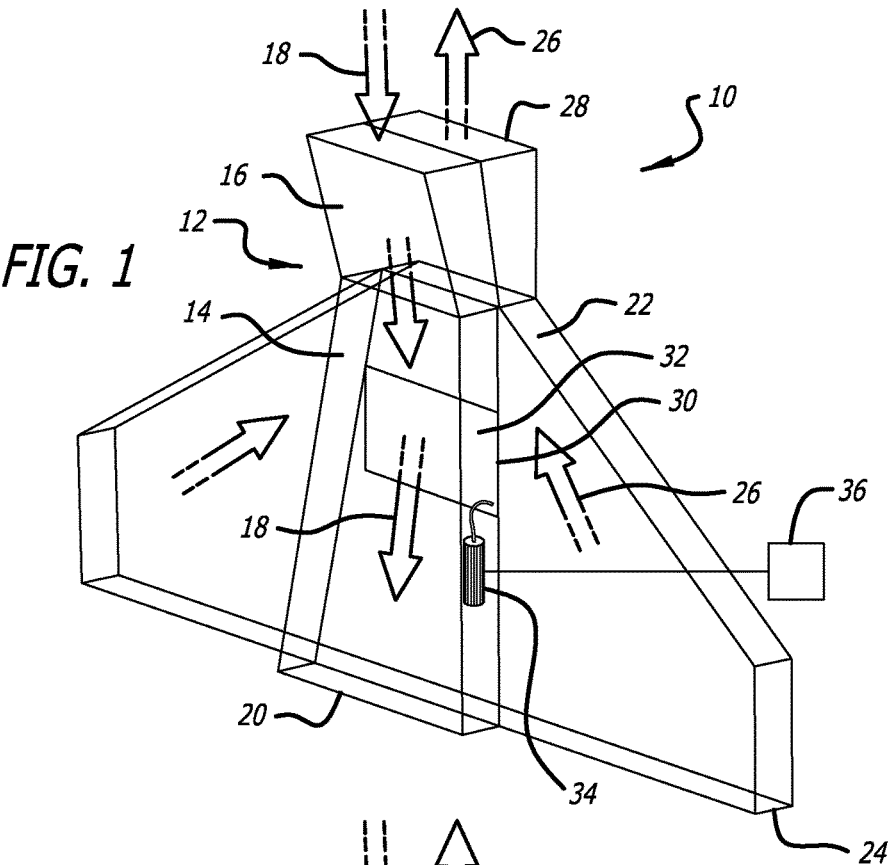
FIG. 1 a schematic diagram of the apparatus for reversing chiller airflow in an air chiller supply air recirculation system of an aircraft galley, according to the invention, showing the recirculation bypass flap in a closed position.

Referring to the drawings, which are provided by way of example, and not by way of limitation, the present invention provides for an apparatus for reversing chiller airflow in an air chiller supply air recirculation system 10 of an aircraft galley (not shown) that is integral to a galley chiller air supply and return ducting assembly 12 including a supply airflow duct 14 having a supply airflow duct inlet portion 16 configured to receive a chilled supply airflow 18 from an evaporator of a chiller unit (not shown), and a supply airflow duct outlet portion 20 configured to deliver the chilled air to one or more galley carts (not shown).

Figure 2:
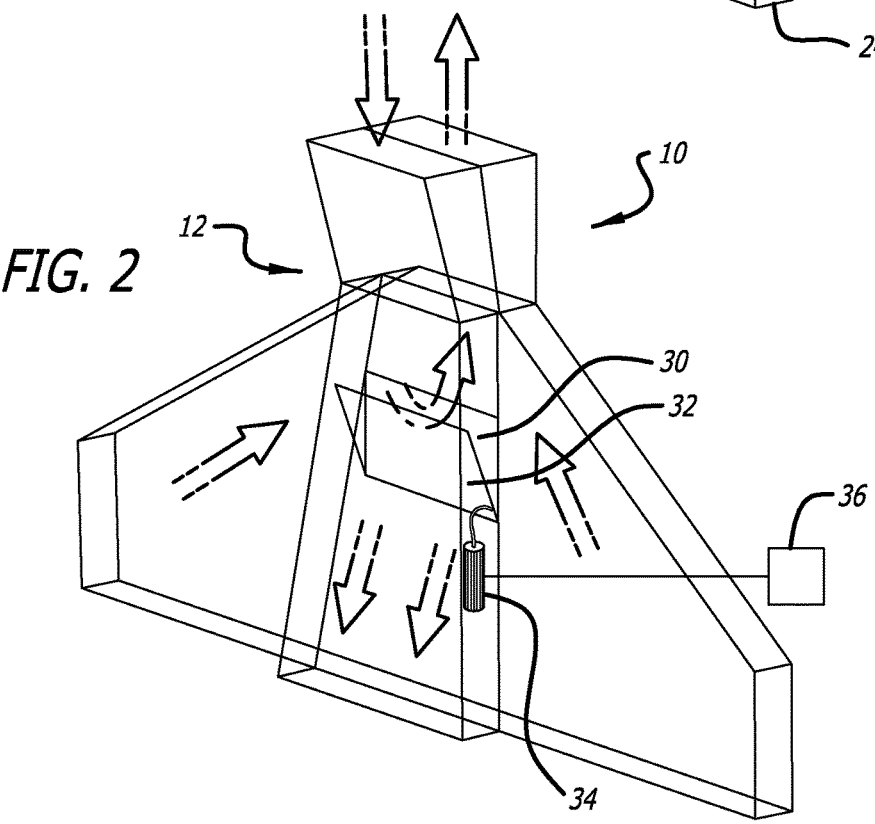
FIG. 2 is a schematic diagram similar to FIG. 1, showing the recirculation bypass flap in an open position.

The galley chiller air supply and return ducting also includes a return airflow duct 22 having an air return inlet portion 24 configured to receive a return airflow 26 from the one or more galley carts and an air return outlet portion 28 configured to deliver the return airflow to the evaporator of the chiller unit. The galley chiller air supply and return ducting advantageously includes an air bypass port 30 between the supply airflow duct and the return airflow duct, and an electrically actuated air recirculation bypass flap or damper 32 having a closed configuration, illustrated in FIG. 1, allowing normal airflow circulation through the supply airflow duct, and an open configuration, illustrated in FIG. 2, blocking at least a substantial portion of the supply airflow duct and diverting at least a substantial portion of the chilled supply airflow to the return airflow duct for recirculation to the chiller unit.

The air recirculation bypass flap or damper is typically biased to be in the closed configuration, such as by a return spring or balance of weight, for example, and is movable between the closed and open configurations by a solenoid 34 that is operative to move or allow the air recirculation bypass flap or damper to move to the closed configuration when the solenoid is not energized, and is operative to move the air recirculation bypass flap or damper to the open configuration when the solenoid is energized, typically by an electrical signal from a bay door position detector 36, such as a micro switch, a photoelectric cell, an infrared beam detector, or a similar contact/non-contact detection device, for example, configured to detect opening of a bay door of one or more galley food carts (not shown), and configured to generate an electrical signal indicating opening of a galley food cart bay door.

The apparatus of the invention optionally may include a manual override control for manual control of the air recirculation bypass flap or damper, and optionally may include a visual status indicator configured to indicate whether the air recirculation bypass flap or damper is in the closed or open configuration.

The device is instrumental in meeting requirements for maintaining chilled food at below a set temperature, helps to prevent abuse of a galley chilling system as a means of cooling the galley area in hot climates, and will automatically return the air recirculation bypass flap or damper to the normal operational position when a galley food cart bay door is closed.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An apparatus for reversing chiller airflow in an air chiller supply air recirculation system, the apparatus being adapted to supply one or more galley components of an aircraft galley, the one or more components including at least one of i) a galley food cart and ii) a cart bay having a bay door, the apparatus comprising:

a galley chiller air supply and return ducting assembly including a supply airflow duct having a supply airflow duct inlet portion configured to receive a chilled supply airflow from a chiller unit, and a supply airflow duct outlet portion configured to deliver the chilled air to at the one or more components, and a return airflow duct having an air return inlet portion configured to receive a return airflow from the one or more components, and an air return outlet portion configured to deliver the return airflow to the chiller unit;

an air bypass port connected in fluid communication between said supply airflow duct and said return airflow duct;

an air recirculation bypass member movably mounted adjacent to said air bypass port, said air recirculation bypass member being movable between a closed configuration and an open configuration, said closed configuration allowing normal airflow circulation through the supply airflow duct when the bay door is closed and said open configuration blocking at least a substantial portion of the supply airflow duct and diverting at least a substantial portion of the chilled supply airflow to the return airflow duct to be recirculated the chiller unit when the bay door is open; and an actuator operatively connected to said electrically actuated air recirculation bypass member and configured to move the air recirculation bypass member between said closed and open configurations based on whether the bay door is open or closed;

a bay door position detector configured to detect opening of the bay door and to generate an electrical signal indicating opening of the bay door, wherein said actuator is electrically connected to said bay door position detector to receive said electrical signal indicating opening of the bay door, and said actuator is configured to move said air recirculation bypass member between said closed and open configurations responsive to said electrical signal indicating opening of the bay door.

2. The apparatus of claim 1, wherein said return airflow duct includes a connecting portion adjacent to at least a portion of said supply airflow duct, and said air bypass port is located in said connecting portion.

3. The apparatus of claim 1, wherein said air recirculation bypass member is electrically actuated.

4. The apparatus of claim 1, wherein said air recirculation bypass member is biased to be in the closed configuration.

5. The apparatus of claim 1, wherein said bay door position detector comprises a micro switch.

6. The apparatus of claim 1, wherein said bay door position detector comprises a photoelectric cell.

7. The apparatus of claim 1, further comprising a manual override control for manual control of the air recirculation bypass member.

8. The apparatus of claim 1, further comprising a visual status indicator configured to indicate whether said air recirculation bypass member is in said closed configuration or said open configuration.

9. An apparatus for reversing chiller airflow in an air chiller supply air recirculation system, the apparatus being adapted to supply one or more components of an aircraft galley, the one or more components including at least one cart bay having a bay door, the apparatus comprising:
   a galley chiller air supply and return ducting assembly including
      a supply airflow duct having
         a supply airflow duct inlet portion configured to receive a chilled supply airflow from a chiller unit, and
         a supply airflow duct outlet portion configured to deliver the chilled air to at the one or more components, and
      a return airflow duct having
         an air return inlet portion configured to receive a return airflow from the at one or more components, and
         an air return outlet portion configured to deliver the return airflow to the chiller unit;
   an air bypass port connected in fluid communication between said supply airflow duct and said return airflow duct;
   an air recirculation bypass member movably mounted adjacent to said air bypass port, said air recirculation bypass member being movable between a first configuration allowing airflow circulation through the one or more components when the bay door is closed and said a second configuration diverting at least a substantial portion of the chilled supply airflow to the return airflow duct to be recirculated to the chiller unit bypassing circulation through the one or more components when the bay door is open;
   a bay door position detector configured to detect opening of the bay door and to generate an electrical signal indicating opening of the bay door; and
   an actuator electrically connected to said bay door position detector to receive said electrical signal indicating opening of the galley food cart bay door, said actuator being operatively connected to said electrically actuated air recirculation bypass member and configured to move the air recirculation bypass member between said closed and open configurations responsive to said electrical signal indicating opening of the bay door.

10. The apparatus of claim 9, wherein said return airflow duct includes a connecting portion adjacent to at least a portion of said supply airflow duct, and said air bypass port is located in said connecting portion.

11. The apparatus of claim 9, wherein said air recirculation bypass member is electrically actuated.

12. The apparatus of claim 9, wherein said air recirculation bypass member is biased to be in the closed configuration.

13. The apparatus of claim 9, wherein said bay door position detector comprises a micro switch.

14. The apparatus of claim 9, wherein said bay door position detector comprises a photoelectric cell.

15. The apparatus of claim 9, further comprising a manual override control for manual control of the air recirculation bypass member.

16. The apparatus of claim 9, further comprising a visual status indicator configured to indicate whether said air recirculation bypass member is in said first configuration or said second configuration.

17. The apparatus of claim 9, wherein the first configuration is a closed configuration wherein the bypass member avoids interference with the supply airflow duct.

18. The apparatus of claim 9, wherein the second configuration is an open configuration wherein the bypass member is blocking at least a substantial portion of the supply airflow duct.

19. The apparatus of claim 9, wherein the actuator comprises a solenoid.

* * * * *